United States Patent
Yu et al.

(10) Patent No.: US 8,118,928 B1
(45) Date of Patent: Feb. 21, 2012

(54) CAST CEILING TILE

(75) Inventors: Qing Claire Yu, Libertyville, IL (US); Bangji Cao, Naperville, IL (US); Gregory O. Palm, Beavercreek, OH (US)

(73) Assignee: USG Interiors, LLC, Chicago, IL (US)

( * ) Notice: Subject to any disclaimer, the term of this patent is extended or adjusted under 35 U.S.C. 154(b) by 0 days.

(21) Appl. No.: 12/975,574

(22) Filed: Dec. 22, 2010

(51) Int. Cl.
*C04B 14/46* (2006.01)
*C04B 24/38* (2006.01)

(52) U.S. Cl. ......... 106/711; 106/673; 106/814; 264/340

(58) Field of Classification Search ............... 106/711, 106/814, 673; 264/340
See application file for complete search history.

(56) References Cited

U.S. PATENT DOCUMENTS

| | | | |
|---|---|---|---|
| 5,910,082 A | 6/1999 | Bender et al. | |
| 5,964,934 A * | 10/1999 | Englert | 106/287.1 |
| 6,057,254 A | 5/2000 | Bender et al. | |
| 6,061,985 A | 5/2000 | Kraus et al. | |
| 6,616,804 B2 * | 9/2003 | Foster et al. | 162/129 |
| 2004/0251573 A1 | 12/2004 | Schmid | |
| 2007/0186587 A1 | 8/2007 | Dennert | |
| 2009/0173464 A1 * | 7/2009 | Baig | 162/164.1 |

OTHER PUBLICATIONS

Derwent-Acc-No. 1981-78968D, abstract of Japanese Patent Specification No. JP81041759 (Sep. 1981).*

* cited by examiner

*Primary Examiner* — Anthony J Green
(74) *Attorney, Agent, or Firm* — Pearne & Gordon LLP

(57) ABSTRACT

A cast type ceiling tile comprising a mixture containing 30 to 70% mineral wool, 10 to 40% expanded glass beads, 8 to 20% starch, 0 to 15% stucco, and 0 to 1% boric acid.

4 Claims, No Drawings

CAST CEILING TILE

The invention relates to materials for building construction and, in particular, to ceiling tile compositions.

PRIOR ART

There is a growing awareness of the environmental impact of the manufacture of building materials and products. One potential way of reducing adverse environmental effects and establishing sustainability is by recycling materials. Such recycled materials are sometimes broadly classified as post consumer recycled material and post industrial recycled material. Post consumer recycled material is especially encouraged by such organizations as LEED.

Ceiling tile used in suspended ceilings should have certain performance characteristics that include sound absorption capacity, relatively low density, fire-resistance, and sag-resistance. Besides meeting these criteria, the raw materials used need to be relatively inexpensive to procure and easy to process. These characteristics can be difficult to achieve even with a composite of material. Moreover, the universe of available recycled materials that can contribute one or more of these desirable characteristics, is compatible with other viable materials and does not introduce undesirable characteristics is relatively limited. It is important to find a high recycled content formulation that achieves the desired characteristics, but also is compatible with existing manufacturing equipment and processes.

SUMMARY OF THE INVENTION

The invention involves the discovery that expanded glass beads made from post consumer recycled glass can be successfully used in formulations for high performance cast type ceiling tile. Such glass beads exhibit many characteristics that are advantageous in this application.

More specifically, it has been found that such expanded glass beads are well suited for use as a filler in mineral fiber and starch based cast ceiling tile. In addition to being inert and light in color, the subject glass beads lend themselves to contemporary manufacturing processes. It has been found that these beads are compatible with materials and processes commonly used in cast-type ceiling tile manufacture. The expanded glass beads have a low enough density that they do not adversely increase the density of a ceiling tile and can actually decrease the density of these products. At the same time, the subject glass beads are sufficiently robust to withstand the compressive and shear forces developed when they and other constituents are mechanically mixed to produce the pulp which is ultimately cast into a tile. It has been discovered, surprisingly, that the water content of a pulp with a workable consistency containing the expanded glass beads can be reduced from what is normally required. This reduced water content reduces energy required to dry the cast pulp into a rigid tile, and can achieve higher production through increased line speed.

The expanded glass beads have additional physical properties making them suitable for incorporation in a ceiling tile. The beads are light in color so that they do not require an increase the amount of primer or top coat used on the finish or appearance side of a tile. Additionally, the beads are inert so as to not add to any combustibility or mold hazard to the tile.

DESCRIPTION OF THE PREFERRED EMBODIMENT

Cast ceiling tile of the present invention includes as main components fiber, preferably mineral wool, and starch binder, preferably derived from corn. Both of these components have long been used in ceiling tile compositions. Stucco, i.e. calcium sulfate hemihydrate, or gypsum can optionally be used as a supplemental filler and, optionally, a small amount of boric acid can be used to impart fire-resistance.

In accordance with the invention, expanded glass beads, preferably made from post consumer recycled glass, are utilized as a filler with the foregoing main components and selected optional components. Compared to traditional formulations, with the invention expanded glass beads can be substituted for mineral fiber, typically on a weight basis.

A suitable type of expanded glass bead is available from Poraver North America Ltd., Ontario, Canada. These expanded glass beads have a partially closed cell structure with a bulk density ranging between about 11 to about 25 lbs./ft$^3$. The cell structure is sufficiently closed to at least partially exclude water from the interior volume of the beads. This water exclusion capability is substantially greater on a unit volume basis than, for example, mineral wool nodules.

Incorporation of expanded glass beads into a mineral fiber/starch based cast ceiling tile formulation has been found to reduce the amount of water necessary to successfully make a cast tile. Initially, starch and other additives are combined with hot water to produce a moderately viscous gel. To the gel are introduced mineral wool and glass beads which are mechanically mixed to produce a castable pulp of a much higher viscosity than the original gel. When the mineral fiber is introduced to the water based gel, it soaks up the gel so as to produce a high density tile. With the introduction in the formulation of expanded glass beads, with a reduction of mineral wool content, there is a reduction in the amount of water required to mix and wet out the components. This water reduction or reduced water load decreases the necessary volume of process water and the amount of heat energy necessary to evaporate the water used in the gel and resulting pulp. In the highly viscous state, the pulp is cast on metal trays, typically lined with paper or foil. The trays are delivered into a drying oven where moisture in the pulp is evaporated leaving the solids to form a rigid tile.

A preferable bead size of the expanded glass beads is between about 1 and about 2 mm. Beads of this size mix well in the pulp, are unobtrusive in the finish surface, and are small enough to allow a tile to be cut without undue friability. Further, expanded glass beads of the preferred size have a bulk density of about 14 lbs./cubic ft. A density this low can be effective in reducing the density of a cast mineral fiber/starch based tile. For example, tiles practicing the invention can have a density of about 18 to about 21 lbs./ft$^3$ while prior art tiles can have a density of about 20 to about 24 lbs./ft$^3$.

Expanded post consumer recycled glass beads are light and consistent in color and consequently do not require additional amounts of top coat or paint that is applied to the tile to give it a white, high reflectivity finish.

A preferred formulation range of constituents for a cast mineral fiber/starch binder ceiling tile is given in the following table:

| | |
|---|---|
| mineral wool | 30-70% |
| glass beads | 10-40% |
| starch binder | 8-20% |
| stucco | 0-15% |
| boric acid | 0-1% |

A more preferred formulation range of constituents for a mineral fiber/starch binder cast ceiling tile is given in the following more specific ranges:

| | |
|---|---|
| mineral wool | 50-55% |
| glass beads | 20-25% |
| starch binder | 13-15% |
| stucco | 10-12% |
| boric acid | 0-1% |

A tile formulated according to the invention can have a caliper between about ¾" and ⅞".

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A cast ceiling tile comprising a mixture containing 30 to 70% mineral wool, 10 to 40% expanded glass beads, 8 to 20% starch, 0 to 15% stucco, and 0 to 1% boric acid, and being the result of evaporating a water content of a viscous cast pulp of said mixture.

2. A cast ceiling tile comprising a mixture containing 50 to 55% mineral wool, 20 to 25% expanded glass beads, 13 to 15% starch, 10 to 12% stucco, and 0 to 1% boric acid, and being the result of evaporating a water content of a viscous cast pulp of said mixture.

3. A cast ceiling tile as set forth in claim 2, wherein the expanded glass beads have a particle size of about 1 to about 2 mm, and a bulk density of about 14 lbs./ft$^3$.

4. A cast ceiling tile as set forth in claim 3, wherein the tile has a density of about 18 to about 21 lbs./ft$^3$.

* * * * *